(12) United States Patent
Wen-Hsuan et al.

(10) Patent No.: US 6,575,781 B2
(45) Date of Patent: Jun. 10, 2003

(54) POWER SUPPLY APPARATUS WITH POWER CORD SECURING DEVICE

(76) Inventors: Lee Wen-Hsuan, No. 31-1, Shien Pan Rd., Kuei San Industrial Zone, Taoyuan Shien (TW); Chia-Fu Liu, No. 31-1, Shien Pan Rd., Kuei San Industrial Zone, Taoyuan Shien (TW)

( * ) Notice: Subject to any disclaimer, the term of this patent is extended or adjusted under 35 U.S.C. 154(b) by 0 days.

(21) Appl. No.: 10/086,212

(22) Filed: Feb. 28, 2002

(65) Prior Publication Data

US 2003/0045163 A1 Mar. 6, 2003

(30) Foreign Application Priority Data

Aug. 31, 2001 (TW) ......................................... 090215020

(51) Int. Cl.[7] .............................................. H01R 13/72
(52) U.S. Cl. .......................... 439/501; 191/12.4; 439/13
(58) Field of Search .......................... 439/13, 501, 502, 439/4; 191/12.4

(56) References Cited

U.S. PATENT DOCUMENTS 5,422,957 A * 6/1995 Cummins ................... 439/501
5,701,981 A * 12/1997 Marshall et al. ............ 439/501
6,048,211 A * 4/2000 Liaom .......................... 439/4
6,325,665 B1 * 12/2001 Chung ........................ 439/501

* cited by examiner

Primary Examiner—P. Austin Bradley
Assistant Examiner—Briggitte R. Hammond
(74) Attorney, Agent, or Firm—Trojan Law Offices; R. Joseph Trojan; Jessica J. Slusser

(57) ABSTRACT

A power cord securing device is installed within a housing of an electrical appliance for securing a power cord. The power cord securing device includes a rotatable plate having a first part for being wound by the power cord, and a resilience element having a first terminal and a second terminal respectively connected to a second part and a third part of the rotatable plate. When the power cord is stretched, the rotatable plate is forced to rotate in a first direction and allow the resilience element to result in an counterforce, and when the counterforce is relieved, the rotatable plate rotates in a second direction opposite to the first direction.

13 Claims, 5 Drawing Sheets

US 6,575,781 B2

POWER SUPPLY APPARATUS WITH POWER CORD SECURING DEVICE

This application claims priority to Taiwan patent application Serial No. 090215020, filed Aug. 31, 2001.

FIELD OF THE INVENTION

The present invention relates to a power cord securing device, and more particularly to a power cord securing device for use with a power supply apparatus.

BACKGROUND OF THE INVENTION

An electronic appliance, such as a printer, a radio, a modem and a notebook, is generally equipped with an adapter for rectifying and converting the commercially available AC power supply into direct current (DC) power supply, so as to supply the required power to operate the electronic appliance.

FIG. 1 is a view illustrating an adapter of the prior art. The adapter includes a housing 11, wherein one side 111 of the housing 11 has an AC inlet 12 matching with a corresponding connector 161. The connector 161 is provided on one end of a power cable 162, while the other end of the power cable 162 is provided with a plug 163. The power adapter of FIG. 1 receives commercially available AC power supply by connecting the plug 163 to a wall socket (not shown). Another side 112 of the adapter extends a power cord 14 for transferring the DC power supply to an electronic appliance.

Since the power cord 14 has a length of from about 1 to 10 meters, a special consideration should be given to secure the power cord 14. A strap 15 is widely used to secure a bundled power cord 14 for storage. When the adapter is to be employed, the strap 15 has to be unfastened in advance and the power cord 14 can be stretched out to be connected with an electronic appliance.

However, the above-mentioned power cord securing device still has some disadvantages in practice:

1. the bundling strap 15 is readily lost, because the strap 15 is isolated from the adapter housing 11; and
2. the bundled power cord 14 is suspended over the housing 11, which results in an inferior appearance and occupies a lot of space.

Therefore, there is a need to provide an improved power cord securing device so as to overcome the problems described above.

SUMMARY OF THE INVENTION

It is an object of the present invention to provide a power supply apparatus for securing the power cord within a housing thereof.

It is another object of the present invention to provide a power cord securing device capable of automatically securing power cord.

In accordance with an aspect of the present invention, there is provided a power supply apparatus. The power supply apparatus includes an upper housing, a low housing, an AC inlet for accepting an AC power supply, a circuit board for converting the AC power supply into a DC power supply, a power cord for transferring the DC power supply to an electrical appliance, and a power cord securing device. The power cord securing device includes a first sleeve, a rotatable plate and a resilience element. The first sleeve has a first end connected to the upper housing. The rotatable plate has a first projecting ring extending from a first surface thereof and a second sleeve and a second projecting ring extending from an second surface thereof, wherein the second sleeve has a hollow region and the first sleeve penetrates through the hollow region. The resilience element has a first terminal connected to the second sleeve and a second terminal connected to the second projecting ring. One end of the power cord is electrically connected with the circuit board, a portion of the power cord is wound around the first projecting ring, and the other end of the power cord is disposed outside the upper housing. When the power cord is stretched, the rotatable plate is forced to rotate in a first direction and allow the resilience element to result in a counterforce, and when the counterforce is relieved, the rotatable plate rotates in a second direction opposite to the first direction.

Preferably, the upper housing further comprises a first opening.

Preferably, the first sleeve further comprises a second opening in a side surface thereof.

Preferably, the power supply apparatus further includes a partition connected to the upper housing and in contact with the second sleeve.

Preferably, the partition further has a third opening for accommodating a second end of the first sleeve.

Preferably, the first projecting ring has a notch.

Preferably, the power supply apparatus further includes a retaining element for positioning the rotatable plate.

Preferably, the rotatable plate has a plurality of teeth on the peripheral surface thereof and the retaining element is a rod corresponding to the plurality of teeth.

In accordance with another aspect of the present invention, there is provided a power cord securing device installed within a housing of an electrical appliance for securing a power cord. The power cord securing device includes a rotatable plate having a first part for being wound by the power cord, and a resilience element having a first terminal and a second terminal respectively connected to a second part and a third part of the rotatable plate. When the power cord is stretched, the rotatable plate is forced to rotate in a first direction and allow the resilience element to result in an counterforce, and when the counterforce is relieved, the rotatable plate rotates in a second direction opposite to the first direction.

Preferably, the electrical appliance is one of an adapter and a charger.

Preferably, the power cord securing device further includes a retaining element for positioning the rotatable plate so as to retain the counterforce.

In accordance with another aspect of the present invention, there is provided a power cord securing device installed within a housing of an adapter for securing a power cord. The power cord securing device includes a rotatable plate having a first part for being wound by the power cord, and a resilience element having a first end and a second end respectively connected to a second part and a third part of the rotatable plate, wherein when the power cord is stretched, the rotatable plate is forced to rotate in a first direction and allow the resilience element to result in an counterforce, and when the counterforce is relieved, the rotatable plate rotates in a second direction opposite to the first direction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
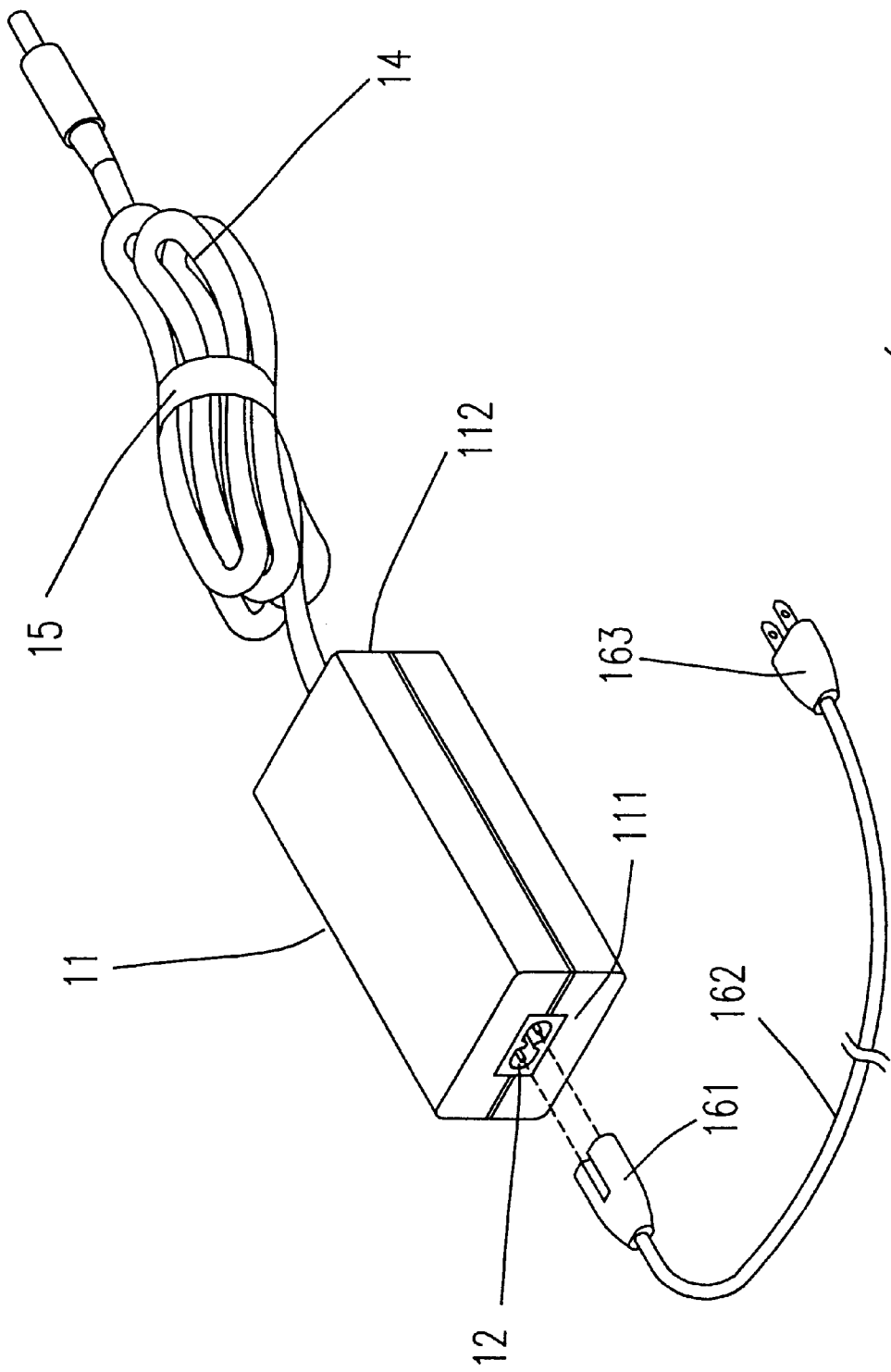
FIG. 1 is a perspective view showing a power cord securing device according to the prior art.
Figure 2:
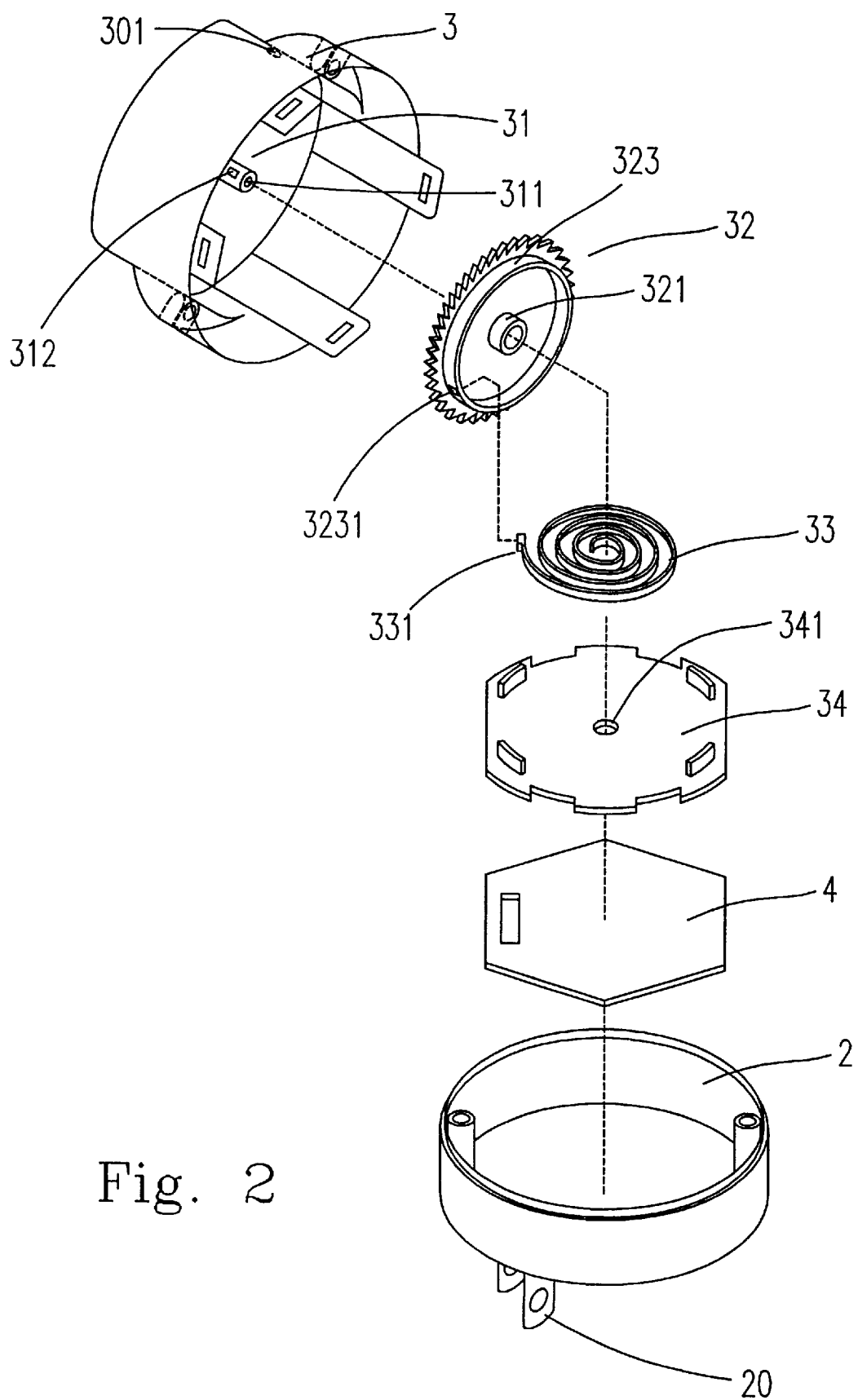
FIG. 2 is an exploded view of a power supply apparatus of the present invention without showing a power cord.

Please refer to FIG. 2. The power supply apparatus of the present invention principally includes a lower housing 2, an upper housing 3, and a circuit board 4. The lower housing 2 has an AC inlet, such as two plugs 20, for accepting an AC power supply. The upper housing 3 has a first opening 301. The circuit board 4 is employed for converting the AC power supply into a DC power supply. The operation and principle of the circuit board 4 are well known in the art and need not be further described in details herein.

Figure 3:
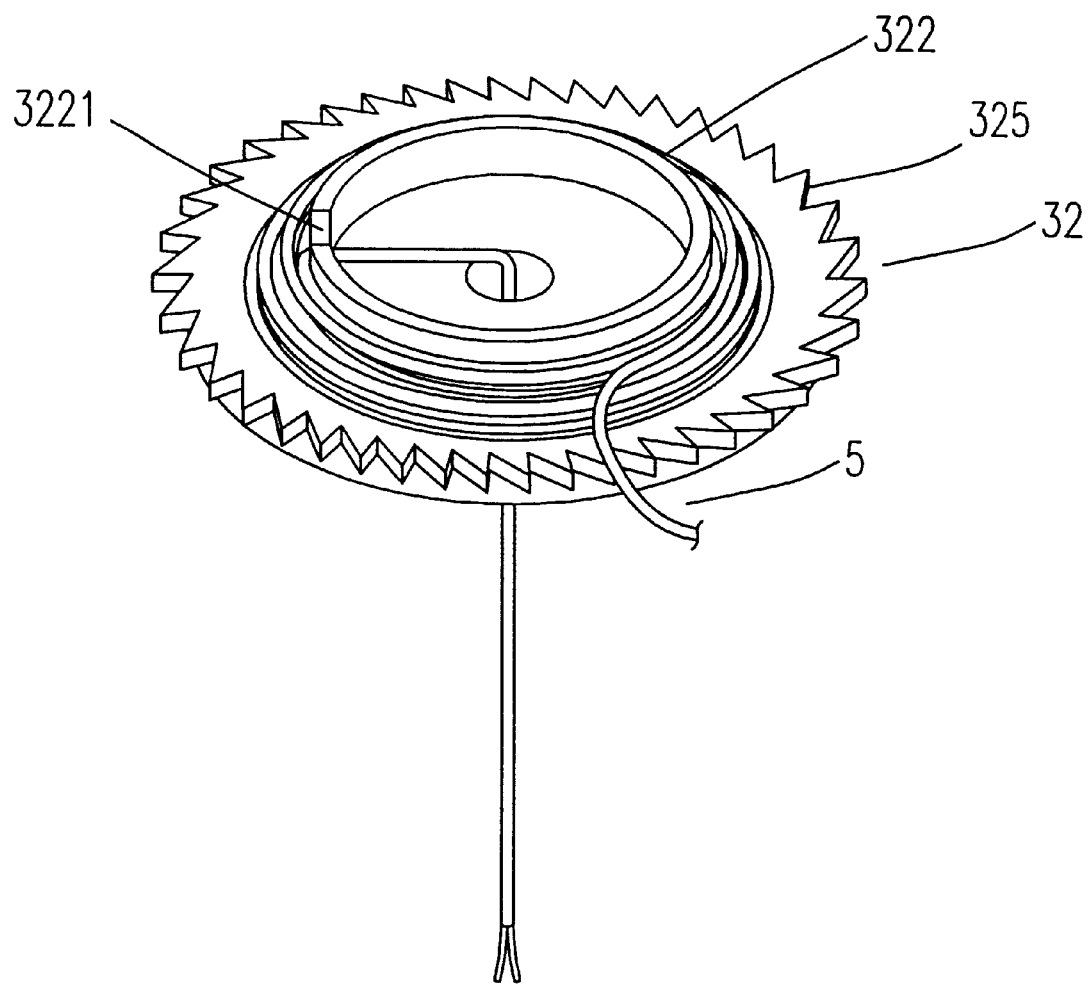
FIG. 3 is a schematic diagram illustrating the rotatable plate in FIG. 2 wound by a power cord.

The power cord securing device in accordance with the present invention includes a first sleeve 31, a rotatable plate 32, a resilience element 33 and a partition 34. The first sleeve 31 has one end connected to the inner side of the upper housing 3. The first sleeve 31 includes a hollow part 311 in the center thereof and a second opening 312 in a side surface thereof. The rotatable plate 32 has a first projecting ring 322 extending from the top surface thereof, and has a second sleeve 321 and a second projecting ring 323 extending from the bottom surface thereof. The second projecting ring 323 has a cavity 3231. The first projecting ring 322 has a notch 3221, as can be seen in FIG. 3. The resilience element 33 is preferably made of metal or plastic material and can be in any shape. In this embodiment, the resilience element 33 is spiral-shaped, and having an inner terminal connected to the second sleeve 321 and an external terminal 331 corresponding to the cavity 3231 for being coupled with the second projecting ring 323. The partition 34 has a third opening 341 depending on the first sleeve 31 for accommodating the top end of the first sleeve 31.

The process for assembling the power cord securing device principally includes the steps of: (a) coupling the resilience element 33: with rotatable plate 32; (b) allowing the first sleeve 31 to penetrate through the hollow region of the second sleeve 321; (c) allowing the partition 34 to be connected to the upper housing 3. The steps (a) and (b) could be conducted in either order.

Figure 4:
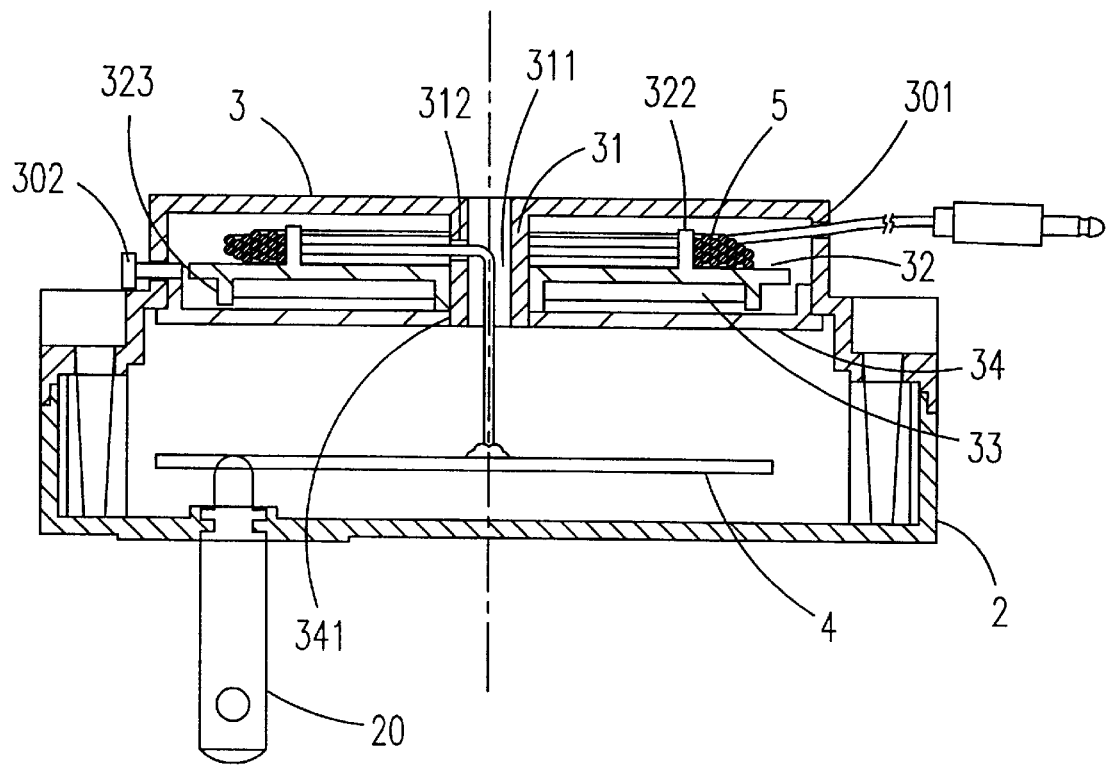
FIG. 4 is a cross-sectional view illustrating the power supply apparatus of the present invention, wherein a portion of power cord is secured.

FIG. 3 is a schematic diagram illustrating that a portion of power cord 5 is wound around the rotatable plate 32. FIG. 4 schematically shows the power cord 5 secured on the power cord securing device of the present invention.

Figure 5:
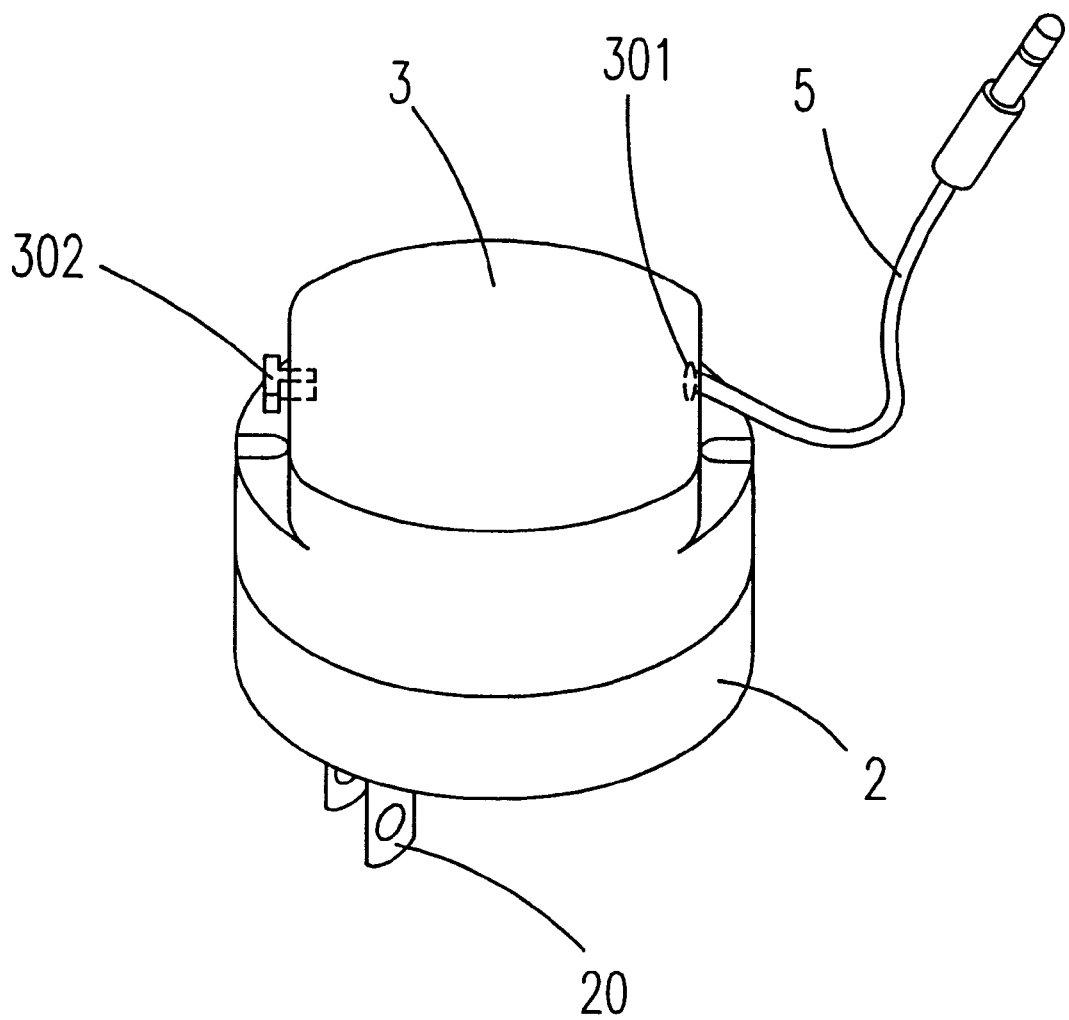
FIG. 5 is a perspective view illustrating the power supply apparatus of the present invention.

Referring to FIGS. 3 and 4, one end of the power cord 5 is fixed at and electrically connected with the circuit board 4, while the other end thereof is disposed outside the upper housing 3. The path of the remaining power cord 5, from the circuit board 4, is in the order of penetrating through the hollow part 311 and the second opening 312 of the first sleeve 31, going across the notch 3221 of the first projecting ring 322, winding a portion of power cord 5 around the first projecting ring 322, and penetrating through the first opening 301 of the upper housing 3. After the lower housing 2 is jointed with the upper housing 3, the power supply apparatus of the present invention is finished, as can be seen in FIG. 5.

The working mechanism of the power cord securing device will be illustrated hereinafter. When the power cord 5 is fully secured, the resilience element 33 is at its rest state. When the power cord 5 is stretched outside the upper housing 3, the rotatable plate 32 is forced to rotate in a first direction and thus the resilience element 33 results in a counterforce due to deformation. When the counterforce is relieved, i.e. the stretched power cord 5 is loosed, the rotatable plate 32 rotates in a second direction opposite to the first direction such that the power cord 5 will be secured on the rotatable plate 32.

In order to retain the stretched power cord 5 at a specified length, the peripheral surface of the rotatable plate 32 has a plurality of teeth 325 thereon, as can be seen in FIG. 3. A retaining element 302, for example a rod, is disposed on the upper housing 3 corresponding to the plurality of teeth 325. When the retaining element 302 is pressed against the teeth 325, the rotatable plate 32 is positioned so as to retain the counterforce and the specified length. When the retaining element 302 is pulled, the counterforce is relieved and thus the powered cord 5 is secured for storage.

As will be apparent from the above description, the structures of the power cord securing device and the power supply apparatus of the present invention have the following advantages:

1. since the power cord could be automatically secured, the power cord securing device is user-friendly; and
2. since the power cord is secured within the housing of the power supply apparatus, the power cord will be no longer suspended over the housing and the problem of losing bundling strap 15 will not exist.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus comprising an upper housing, a low housing, an AC inlet for accepting an AC power supply, a circuit board for converting said AC power supply into a DC power supply, a power cord for transferring said DC power supply to an electrical appliance, and a power cord securing device, characterized in that said power cord securing device comprising:

a first sleeve having a first end connected to said upper housing;

a rotatable plate having a first projecting ring extending from a first surface thereof and a second sleeve and a second projecting ring extending from an second surface thereof, wherein said second sleeve has a hollow region and said first sleeve penetrates through said hollow region; and a resilience element having a first terminal connected to said second sleeve and a second terminal connected to said second projecting ring;

wherein one end of said power cord is electrically connected with said circuit board, a portion of said power cord is wound around said first projecting ring, and the other end of said power cord is disposed outside said upper housing, wherein when said power cord is stretched, said rotatable plate is forced to rotate in a first direction and allow said resilience element to result in a counterforce, and when said counterforce is relieved, said rotatable plate rotates in a second direction opposite to said first direction.

2. The power supply apparatus according to claim 1 wherein said upper housing further comprises a first opening.

3. The power supply apparatus according to claim 1 wherein said first sleeve further comprises a second opening in a side surface thereof.

4. The power supply apparatus according to claim 1 further comprising a partition connected to said upper housing and in contact with said second sleeve.

5. The power supply apparatus according to claim 4 wherein said partition further has a third opening for accommodating a second end of said first sleeve.

6. The power supply apparatus according to claim 1 wherein said first projecting ring has a notch.

7. The power supply apparatus according to claim 1 further comprising a retaining element for positioning said rotatable plate.

8. The power supply apparatus according to claim 7 wherein said rotatable plate has a plurality of teeth on the peripheral surface thereof and said retaining element is a rod corresponding to said plurality of teeth.

9. A power cord securing device installed within a housing of an electrical apparatus for securing a power cord, comprising:
   a first sleeve having a first end connected to said housing;
   a rotatable plate having a first projecting ring extending from a first surface thereof, and a second sleeve and a second projecting ring extending from a second surface thereof, wherein said second sleeve has a hollow region and said first sleeve penetrates through said hollow region; and
   a resilience element having a first terminal and a second terminal respectively connected to said second sleeve and said second projecting ring of said rotatable plate;
   wherein when said power cord is stretched, said rotatable plate is forced to rotate in a first direction and allow said resilience element to result in a counterforce, and when said counterforce is relieved, said rotatable plate rotates in a second direction opposite to said first direction.

10. The power cord securing device according to claim 9 wherein said electrical apparatus is one of an adapter and a charger.

11. The power cord securing device according to claim 9 further comprising a retaining element for positioning said rotatable plate so as to retain said counterforce.

12. A power cord securing device installed within a housing of an adapter for securing a power cord, comprising:
   a first sleeve having a first end connected to said housing;
   a rotatable plate having a first projecting ring extending from a first surface thereof, and a second sleeve and a second projecting ring extending from a second surface thereof, wherein said second sleeve has a hollow region and said first sleeve penetrates through said hollow region; and
   a resilience element having a first end and a second end respectively connected to said second sleeve and said second projecting ring of said rotatable plate;
   wherein when said power cord is stretched, said rotatable plate is forced to rotate in a first direction and allow said resilience element to result in a counterforce, and when said counterforce is relieved, said rotatable plate rotates in a second direction opposite to said first direction.

13. The power cord securing device according to claim 12 further comprising a retaining element for positioning said rotatable plate so as to retain said counterforce.

* * * * *